Dec. 12, 1933.  F. T. COURT  1,938,953
ROD WEEDER
Filed Dec. 26, 1931   3 Sheets-Sheet 1
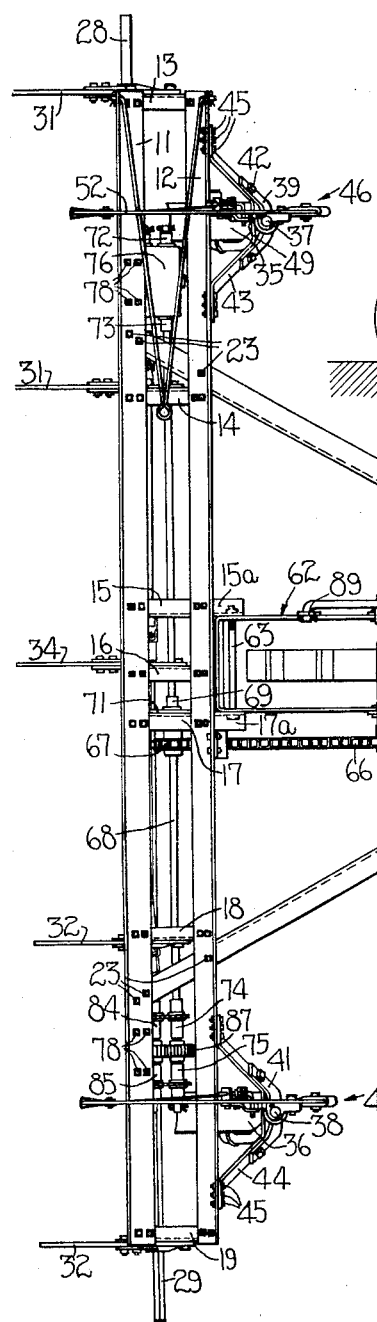
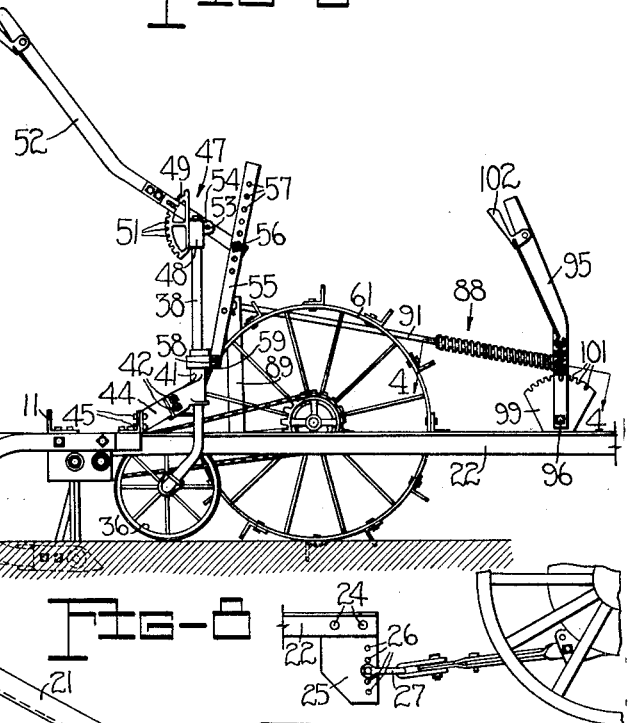
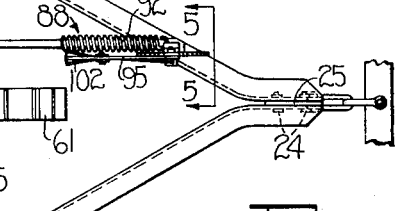
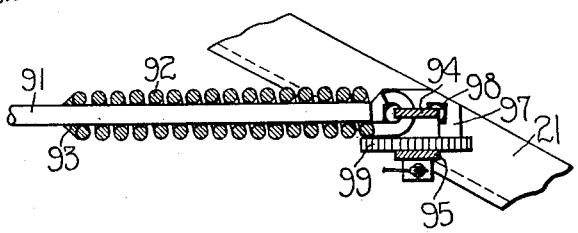
INVENTOR
Frank T. Court,
BY
Brown, Jackson, Boettcher & Dienner.
ATTORNEYS.

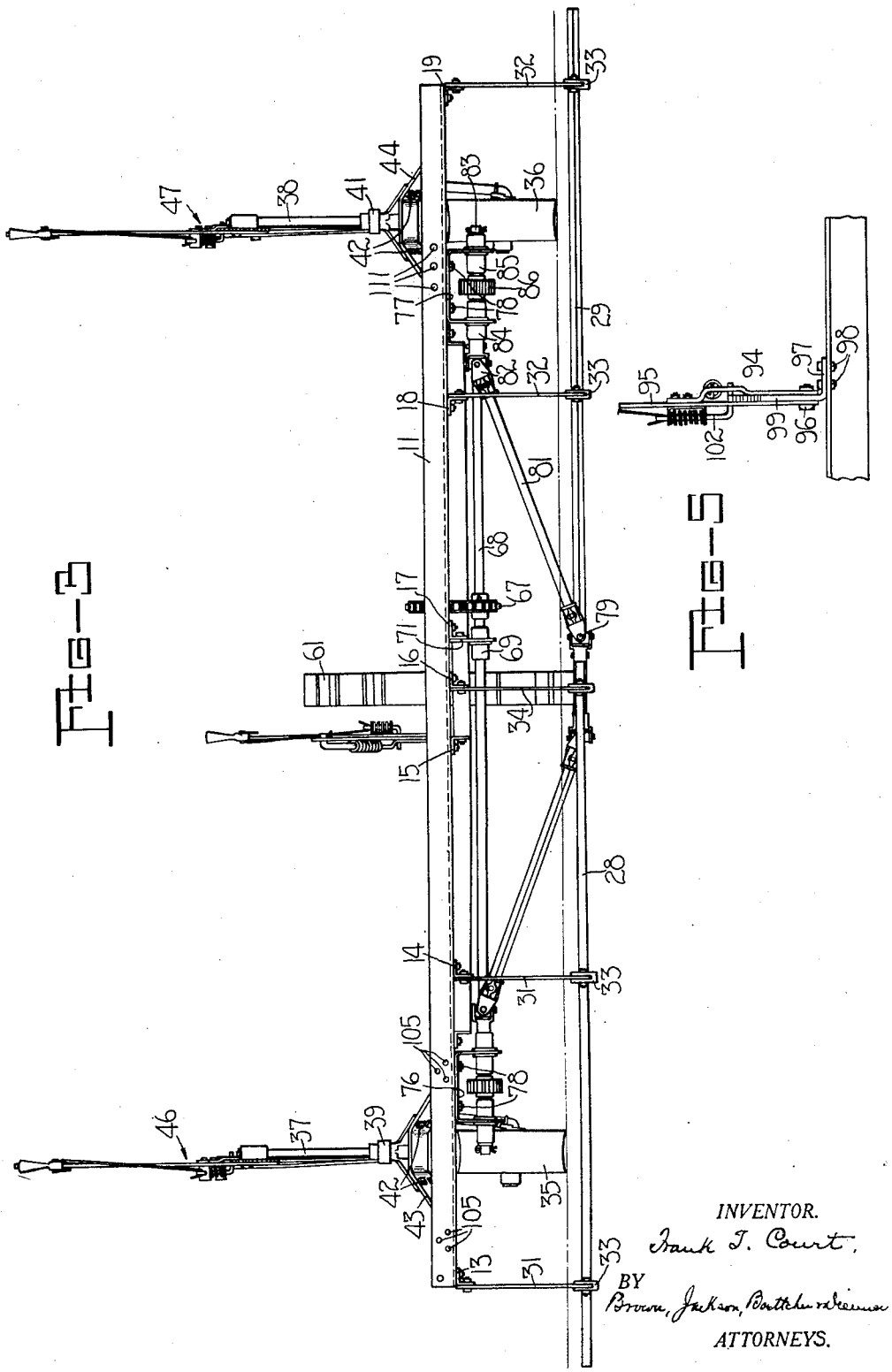

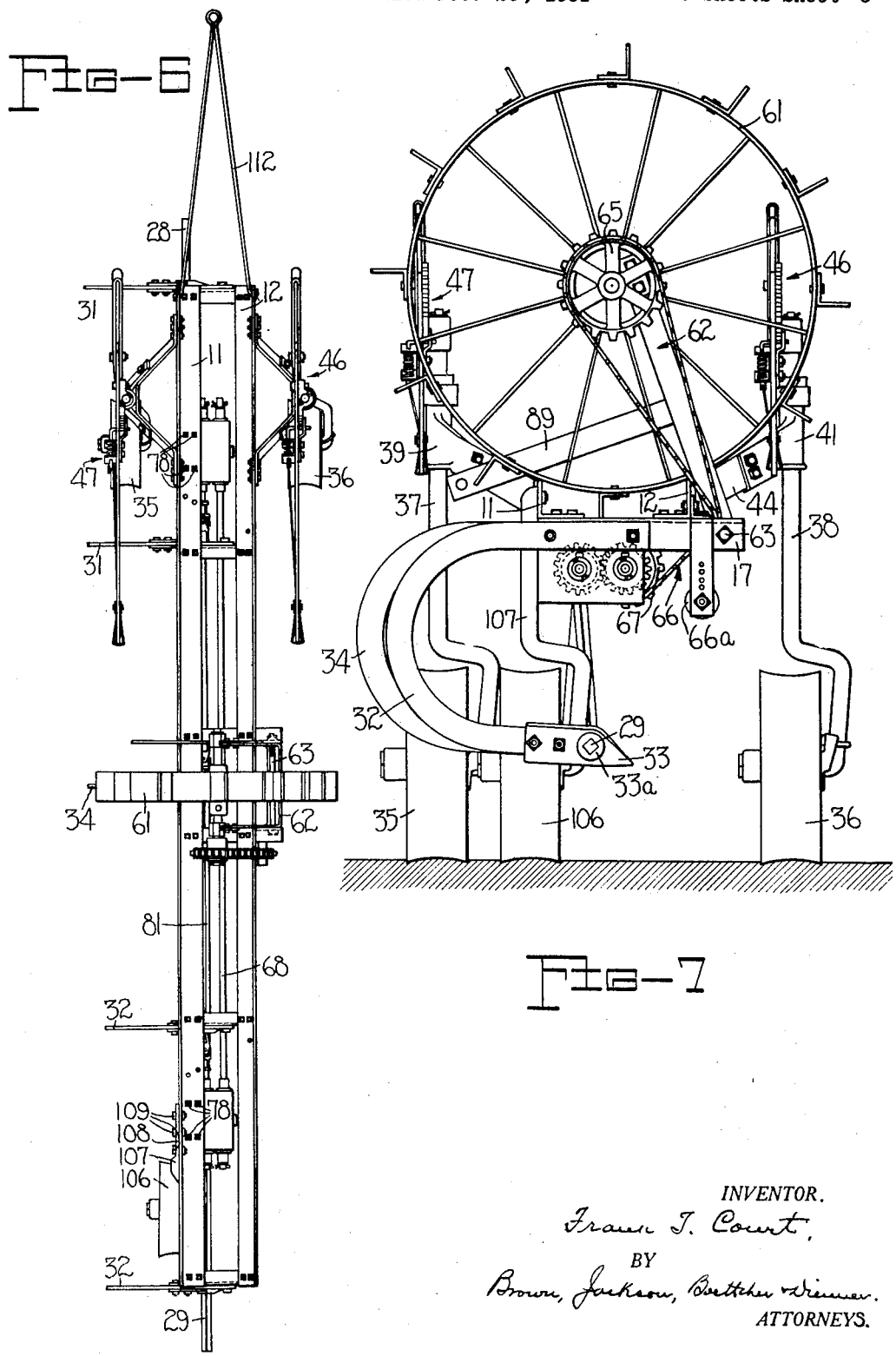

Patented Dec. 12, 1933

1,938,953

UNITED STATES PATENT OFFICE 1,938,953

ROD WEEDER

Frank T. Court, Moline, Ill., assignor to Deere & Company, Moline, Ill., a corporation of Illinois Application December 26, 1931
Serial No. 583,253

20 Claims. (Cl. 97—42)

The present invention relates to agricultural implements, and more particularly to rod weeders of relatively wide span adapted to be drawn by a tractor.

It is the principal object of my present invention to provide in an implement of this type a floating drive wheel for driving the rotary rod of the weeder whereby said wheel can accommodate itself to the contour of the ground without affecting the drive as the tractor rises and falls with respect to the implement in traveling over uneven ground.

Another object of the invention is to provide such a floating drive wheel pivotally connected with the frame whereby it may be swung up and over into position to rest upon the frame in inoperative position, thereby cutting down the overall width of the implement when it is to be moved endwise in transport.

A further object of the invention is to provide means for imposing a portion of the weight of the implement on the floating drive wheel.

A still further object of the invention is to provide means whereby the proportion of the weight of the implement placed upon the drive wheel may be varied to suit particular requirements.

A still further object of the invention is to provide a single drive wheel at the center of the implement, and a gauge wheel at each end of the implement for regulating the depth of penetration of the rotary rod and for supporting the ends of the implement.

A still further object of the invention is to provide such supporting gauge wheels for the implement positioned in front of and in close proximity to the rod, whereby more accurate gauging is made possible and no wheel tracks are left in back of the machine.

A still further object of the present invention is the provision of a wheel supporting structure for the weeder which is capable of supporting the implement when in operation and yet capable of being arranged in position to allow the implement to be moved endwise whereby the overall width of the implement when transporting the same is reduced.

Other objects and advantageous features will be apparent from the following description of the invention taken in connection with the accompanying drawings, in which:

Fig. 1 is a top plan view showing a rod weeder incorporating the features of the present invention, and illustrating the positions of the various parts when in operating position;

Fig. 2 is an end elevational view of the same;

Fig. 3 is a rear elevational view of the same;

Fig. 4 is an enlarged cross sectional view taken on the line 4—4 of Fig. 2;

Fig. 5 is a fragmentary elevational view looking rearwardly and showing the adjusting lever 60 by which the amount of the weight of the implement that is imposed on the drive wheel may be varied;

Fig. 6 is a top plan view showing the arrangement of the various parts when in transport position;

Fig. 7 is an enlarged end elevational view of the same, and illustrating the position the caster wheels assume when the implement is drawn endwise; and Fig. 8 is a view illustrating the connection between the hitch clevis and the tractor drawbar.

The present rod weeder comprises a relatively long rectangular main frame made up of transverse members or bars 11 and 12 connected together by means of relatively short longitudinally extending members 13, 14, 15, 16, 17, 18 and 19. A forwardly extending draft frame comprising members 21 and 22 is rigidly connected to the members 11 and 12 of the main frame by bolts 23 (see Fig. 1), and the forward ends of the members 21 and 22 converge toward each other and are connected together by bolts 24. A hitch clevis 25 is secured between the forward ends of said members 21 and 22 by said bolts and such clevis extends downwardly therefrom. The hitch clevis is provided with a series of holes 26 spaced vertically from each other to accommodate different heights of tractor drawbars, connection to which is made by means of a short U-shaped link 27 (see Fig. 8).

In the type of implement illustrated two rotating rods 28 and 29 are provided, the outer ends of which extend outwardly beyond the outer ends of the implement, while their inner ends overlap slightly at a point approximately midway between the ends of the implement, as shown in Fig. 3. The rod 28 is supported in pendants 31 bolted to the longitudinally extending frame bars 13 and 14. These pendants extend rearwardly from the frame and are curved downwardly and forwardly in goose-neck formation (see Figs. 2 and 7). The rod 29 is supported in similar pendants 32 bolted to the longitudinally extending frame bars 18 and 19. These several pendants 31 and 32 are provided with shoe-like bearing housings 33 in which the respective rotary rods 28 and 29 have bearing supports as by spools 33a. A centrally disposed pendant 34 shaped similarly to the pendants 31 and 32 and bolted to the longitudinally extending frame bar 16 is provided with a special shoe having two longitudinally spaced spools in which the inner ends of the two rods 28 and 29 are respectively journaled. The lower ends of the pendants are adapted to carry the rotary rods into the ground, as is readily understood by those familiar with rotary rod weeder structures.

By reason of the above described arrangement of the rods, one rod may be extended beyond the machine on one side and the other beyond the machine on the other side, which not only makes it possible to use a smaller frame for a given overall length of rod, but also facilitates the connection of a plurality of weeders together.

The greater portion of the weight of the machine is carried by a pair of caster wheels 35 and 36 respectively mounted when in operating position adjacent the opposite ends of the main frame of the implement forward of and in close proximity to the rotary rods 28 and 29, as shown in Figs. 1 and 3. The caster wheels 35 and 36 are also operable to gauge the depth to which the rotary rods 28 and 29 penetrate the ground, as will be hereinafter described. The caster wheels 35 and 36 are respectively mounted on the lower ends of wheel spindles 37 and 38 slidably mounted respectively in suitable sleeves formed in castings 39 and 41 secured by means of bolts 42 to suitable brackets 43 and 44, respectively, which in turn are fixedly connected to the front frame bar 12 of the main frame by bolts 45, as best shown in Fig. 1.

The depth to which the rotary rods 28 and 29 penetrate the ground is controlled by means of lever adjusting mechanisms 46 and 47 connected respectively with the spindles 37 and 38. These two lever adjusting mechanisms are alike in structure, and that indicated by 47 at the right hand end of the implement which is the one illustrated in Fig. 2 will now be described. This mechanism comprises a suitable cap 48 journaled on the upper end of the spindle 38 and provided with an integral rearwardly extending member in the form of a sector 49 provided with notches 51 adapted to receive the latch of a hand lever 52. The lever 52 is pivotally connected adjacent its lower end by a bolt 53 with a lug 54 formed integral with and extending laterally from the cap 48 opposite the sector member 49. As shown, the lever 52 extends beyond such pivot connection 53 and at its lower end is pivotally connected with a relatively long bar 55 by means of a bolt 56 extending through said lever and any one of a series of longitudinally spaced holes 57 in the upper portion of the bar 55. The lower end of the bar 55 is pivotally connected by means of a bolt 58 with a lug 59 extending laterally from the upper portion of the sleeve member of the casting 41.

To adjust the depth of penetration, the hand lever may be swung in one direction or the other on its pivot 53 to move the casting 41 vertically on the spindle 30, thereby raising or lowering the frame relative to the wheel 36 to adjust the depth of penetration of the rod 29. When the desired depth adjustment of the rod 29 is reached the parts are locked in position by permitting the detent of the latch of the hand lever 52 to enter one of the notches 51 in the sector member 49. The range of movement of the casting 41 vertically along the spindle 38, and, therefore, also the range of vertical movement of the rod 29, may also be varied by changing the pivotal connection 56 between the lower end of the hand lever 53 and the bar 55, to accomplish which it is only necessary to move the bolt 56 to one of the other holes 57 in the bar 55, as will be readily understood. The various elements going to make up the adjusting lever mechanism 46 at the opposite side of the implement are the same as those just described in connection with the mechanism 47, and they are therefore indicated by the same reference numerals.

The rotary rods 28 and 29 are rotated by power derived from a drive wheel 61, the mounting of which drive wheel and the means for driving the rods therefrom will now be described. This drive wheel 61 is suitably journaled in bearings provided in the ends of forwardly extending arms of a U-shaped bracket 62 pivotally connected to the forwardly extending ends 15a and 17a of the longitudinal members 15 and 17 of the main frame by means of a bolt 62 extending through said members and said arms, as shown in Fig. 1.

The axle 64 of the drive wheel 61 extends outwardly beyond its bearing in one of the arms of bracket 62, and a sprocket wheel 65 is keyed to such end. The sprocket 65 is connected by means of a chain 66 with a second sprocket 67 keyed to the main drive shaft 68 of the implement. The intermediate portion of the drive shaft 68 is journaled in a bearing 69 supported by a bracket 71 secured to and depending downwardly from the rear frame bar 11 of the main frame, while the opposite ends of said shaft are respectively journaled in pairs of bearings 72, 73 and 74, 75, as best shown in Fig. 1. The bearings 72 and 73 at one end of the shaft 68 are supported in the two depending arms of a U-shaped bracket 76, while the bearings 74 and 75 at the opposite end of the shaft are supported in the two depending arms of a U-shaped bracket 77, each of said brackets being secured to the member 11 of the main frame by means of four bolts 78.

The rotary rod 28 at the left hand side of the implement is driven from the drive shaft 68 through driving connections including a universal joint 79, shaft 81, and universal joint 82 (see Fig. 3). The universal joint 82 is fixed to the inner end of a jack-shaft 83 journaled in bearings 84 and 85 supported in the downwardly extending arms of the U-shaped bracket 77 in rear of the bearings 74 and 75, see Fig. 1. Fixed on the jack-shaft 83 between the bearings 84 and 85 is a gear 86 which meshes with a gear 87 fixed on the main drive shaft 68 between the bearings 74 and 75, whereby the jack-shaft 83 is driven from the main drive shaft 68.

The rod 29 at the opposite side of the implement is driven through similar mechanism from a gear fixed on the opposite end of the shaft 68 between the bearings 72 and 73 and, therefore, it is not deemed necessary to describe the same in detail herein.

For the purpose of imposing a portion of the weight of the implement on the drive wheel 61 to increase its traction, a suitable control mechanism indicated as an entirety by the numeral 88 is provided. This mechanism includes an arm 89 fixed to and extending upwardly from the left hand arm of the U-shaped bracket 62, and a rod 91 pivotally connected to the upper end of the arm 89 and extending forwardly therefrom. As best shown in Fig. 4, the forward end of said rod 91 extends into the coil of a spring 92, and the rear end of the spring is welded to the rod 91 as shown at 93. The front end of the spring is hooked into a perforation in a vertically extending strap 94, the upper end of which is bolted to a hand lever 95 (see Fig. 5). The lower end of the lever 95 and the lower end of the strap 94 are pivotally connected by means of a bolt 96 to a bracket 97 secured to the draft frame member 21 by means of bolts 98 and extending upwardly therefrom between said lever and strap. The upwardly extending portion of the bracket 97 is in the form of an arcuate shaped plate 99 provided in its upper edge with a series of notches 101 (see Fig. 2) for receiving the detent of a spring latch 102 carried by the hand lever 95. As will be readily understood, by moving the hand lever 95 forwardly the spring 92 is stressed in tension, and the greater the tension imposed on the spring the greater is the load applied on the wheel 61. As the lever 95 is moved rearwardly relieving the tension in the spring the weight imposed on the wheel 61 is correspondingly decreased. If the lever is moved rearwardly to a point where spring 92 is under no stress, none of the weight of the implement is imposed on the wheel. If the lever be moved rearwardly beyond such last mentioned position the wheel 61 may be lifted off of the ground, which may sometimes be desirable when transporting the implement with the various parts associated as shown in Figure 1.

In the operation of the implement, as the pulling tractor rises and falls with respect to the implement in travelling over uneven ground, the front end of the draft frame through its hitch connection with the tractor is carried with the tractor causing the frame of the implement to tilt correspondingly. This tilting action of the frame, however, has substantially no effect on the depth position of the rotating rods 22 and 23 because the caster wheels 35 and 36 are positioned very close to and just in front of the rods, and as such wheels regulate the depth of penetration of the rods, such depth is not materially varied. Furthermore, this tilting of the frame of the implement does not affect the drive from the drive wheel 61 to the main drive shaft 68 which drives the rotary rods 22 and 23 because the drive wheel 61 through its pivotal connection 63 with the main frame will float with respect to such frame, and the drive wheel 61, by reason of such floating connection with the frame can accommodate itself to the contour of the ground without affecting the drive. If, in the operation of the implement the drive wheel 61 should meet with a rise or a hollow in the ground surface, it merely rides over such rise or into the hollow, so that a constant driving torque is applied to the rods at all times.

As above mentioned, this implement is one of relatively wide span, and it is therefore desirable that it be moved endwise when transported, and in Figs. 6 and 7 the implement is shown as set up for this purpose. For transporting purposes, the bracket 44, together with the gauge wheel 36 and the means by which it is connected to the bracket, is disconnected from the front frame member 12 by removing the bolts 45, and said bracket is then connected to the rear frame member 11 opposite the gauge wheel 35, suitable openings 105 being provided in the frame member 11 for receiving the bolts 45, as shown in Fig. 3. Provided with the implement is an auxiliary wheel 106 journaled in the lower end of a spindle 107 and this wheel is then mounted under the right hand end of the frame (see Fig. 6). The upper end of the spindle 107 is flattened out at its upper end as shown at 108 and provided with three bolt holes for receiving bolts 109 by which it is secured to the rear frame member 11, said frame member being provided with corresponding bolt holes 111 for receiving said bolts.

The rod 91 is then disconnected from the arm 89; the draft frame is disconnected from the main frame by removing the bolts connecting the members 21 and 22 thereof with the main frame members 11 and 12, and the chain 66 is disconnected from the chain tightener 66a shown in Fig. 7. The wheel 61 is then swung upwardly about its pivot connection 63 to the position shown in Fig. 7, in which position said wheel rests on the top of the members 11 and 12 of said frame. The transverse members 15 and 17 of the main frame, to which the U-shaped bracket carrying the wheel 61 is pivotally connected by the bolt 63, extend forwardly a sufficient distance from the front frame bar 12 of the main frame so that such upward swinging of the wheel is made possible.

For pulling the implement endwise a special draft member 112 is provided (see Fig. 6), and it is pivotally connected to the left hand end of the main frame as shown. As the implement is drawn endwise in the direction of the arrow in Fig. 6, the caster wheels 35 and 36 will assume the position shown in said figure.

I claim:

1. In a rotary rod weeder, the combination of a frame, a transversely extending rotary rod carried by said frame and adapted to penetrate the ground, a drive wheel for driving said rod connected with the frame for floating movement relative thereto, and means for loading the drive wheel to increase the traction.

2. In a rotary rod weeder, the combination of a frame, gauge wheels supporting said frame, a transversely extending rotary rod carried by said frame and adapted to penetrate the ground, a drive wheel for driving said rod positioned intermediate the ends of said frame, means for loading the drive wheel to increase the traction thereof, and means for adjusting the loading means to vary the magnitude thereof.

3. In a rotary rod weeder, the combination of a frame, supporting wheels therefor, a transversely extending rotary rod carried by said frame and adapted to penetrate the ground, a drive wheel for driving said rod connected with the frame for floating movement relative thereto, and means for imposing a portion of the weight of the implement on said drive wheel.

4. In a rotary rod weeder, the combination of a frame, supporting wheels therefor, a transversely extending rotary rod carried by said frame and adapted to penetrate the ground, a drive wheel for driving said rod connected with the frame for floating movement relative thereto, and means for imposing a portion of the weight of the implement on said drive wheel, said means being also operable to raise the drive wheel off of the ground.

5. In a rotary rod weeder, the combination of a frame, a transversely extending rotary rod carried by said frame and adapted to penetrate the ground, a bracket pivotally connected with said frame for vertical movement relative thereto, a drive wheel for driving said rod journaled in said bracket, whereby said wheel can move vertically relative to the frame, and means for imposing a portion of the weight of the implement on said drive wheel, said means comprising a spring connected with the bracket and with the frame.

6. In a rotary rod weeder, the combination of a frame, a transversely extending rotary rod carried by said frame and adapted to penetrate the ground, gauge wheels supporting the outer ends of said frame and operable to gauge the depth of penetration of said rotary rod, a drive wheel for driving said rotary rod connected with the frame for floating movement relative thereto, and means for imposing a portion of the weight of the implement on said drive wheel, said means being aranged so that the portion of the weight of the implement to which the wheel is subjected is not materially changed as the wheel moves vertically relative to the frame within the limits of the movement of the wheel under normal operating conditions.

7. In a rotary rod weeder, the combination of a frame, a transversely extending rotary rod carried by said frame and adapted to penetrate the ground, gauge wheels supporting the outer ends of said frame and operable to gauge the depth of penetration of said rotary rod, a drive wheel positioned intermediate said gauge wheels for driving said rotary rod and connected with the frame for floating movement relative thereto, and means for imposing a portion of the weight of the implement on said drive wheel.

8. In a rotary rod weeder, the combination of a frame, a transversely extending rotary rod carried by said frame and adapted to penetrate the ground, gauge wheels supporting the outer ends of said frame and operable to gauge the depth of penetration of said rotary rod, a drive wheel for driving said rod connected with the frame for floating movement relative thereto, means for imposing a portion of the weight of the implement on said drive wheel, and means acting in conjunction with said first named means operable to vary the amount of weight of said frame imposed upon said drive wheel.

9. In a rotary rod weeder, the combination of a frame, supporting wheels therefor, a transversely extending rotary rod carried by said frame and adapted to penetrate the ground, a drive wheel for driving said rod connected with the frame for floating movement relative thereto, and means for imposing a portion of the weight of the implement on said drive wheel, said means being operable to vary the amount of weight of said frame imposed on said drive wheel.

10. In a rotary rod weeder, the combination of a frame, a pair of transversely extending rotary rods carried by said frame and adapted to penetrate the ground, said rods having their adjacent ends disposed between the ends of said frames, means supporting the outer ends of said frame and operable to gauge the depth of penetration of said rotary rods, and a drive wheel for driving said rotary rod positioned midway between the ends of said frame and operatively connected with said rotary rods near their adjacent ends to drive the rods.

11. In a rotary rod weeder, the combination of a frame, a transversely extending rotary rod carried by said frame and adapted to penetrate the ground, castering gauge wheels supporting the outer ends of said frame and operable to gauge the depth of penetration of said rotary rod, and a drive wheel for driving said rotary rod connected with the frame for floating movement relative thereto.

12. In a rotary rod weeder, the combination of a frame, transversely extending rotary rod means carried by said frame and adapted to penetrate the ground, gauge wheels positioned forward of said rotary rod for supporting said frame and gauging the depth of penetration of said rotary rod, and a drive wheel positioned midway between the ends of said rotary rod for driving said rod.

13. In a rotary rod weeder, the combination of a frame, a transversely extending rotary rod carried by said frame and adapted to penetrate the ground, castering gauge wheels supporting the outer ends of said frame and positioned forward of and in close proximity to said rotary rod for gauging the depth of penetration of said rod, and a floating drive wheel positioned midway between the ends of said rotary rod for driving said rod.

14. In a rotary rod weeder, the combination of a frame, a transversely extending rotary rod carried by said frame and adapted to pentrate the ground, castering gauge wheels positioned forward of and in close proximity to said rotary rod for supporting said frame and gauging the depth of penetration of said rotary rod and a floating drive wheel positioned midway between the ends of said rotary rod for driving said rod.

15. In a rotary rod weeder, the combination of a frame, castering gauge wheels supporting the outer ends of said frame, a transversely extending rotary rod carried by said frame and adapted to penetrate the ground, a drive wheel for driving said rod, and means pivotally connecting said drive wheel with said frame whereby said drive wheel may be swung on said pivot means to transport position upon said frame.

16. In a rotary rod weeder, the combination of a frame, a transversely extending rotary rod carried by said frame and adapted to penetrate the ground, castering gauge wheels positioned forward of and in close proximity to said rotary rod adjacent the outer ends thereof for supporting said frame and gauging the depth of penetration of said rotary rod, a drive wheel for driving said rod, and pivot means connecting said drive wheel with said frame whereby said drive wheel has floating movement relative to said frame when in operative position and is swingable on said pivot means to move it to an inoperative position over said frame.

17. In a rotary rod weeder, the combination of a frame comprising a pair of relatively long transverse members and relatively short longitudinal connecting members, the intermediate pair of longitudinal members being spaced apart transversely and extending forwardly of said forward transverse member, a transversely extending rotary rod carried by said frame and adapted to penetrate the ground, castering gauge wheels positioned forward of and in close proximity to said rotary rod adjacent the outer ends thereof for supporting said frame and gauging the depth of penetration of said rotary rod, a forwardly extending bracket including transversely spaced arms and pivotally connected by pivot means with the forwardly extended portions of said intermediate members for movement in a vertical plane, a drive wheel for driving said rotary rod journaled on said bracket between the arms thereof, whereby said drive wheel has floating movement relative to said frame when in operative position and is swingable on said pivot means to move it to an inoperative position over said frame.

18. In a rotary rod weeder, the combination of a frame, a transversely extending rotary rod carried by said frame and adapted to penetrate the ground, castering gauge wheels supporting the outer ends of said frame and operable to gauge the depth of penetration of said rotary rod, a drive wheel for driving said rotary rod connected with the frame for floating movement relative thereto, and means for raising the drive wheel out of contact with the ground to provide for endwise transport of the frame on said castering wheels.

19. In a rotary rod weeder, the combination of a frame, a transversely extending rotary rod carried by said frame and adapted to penetrate the ground, wheels supporting the outer ends of said frame and operable to gauge the depth of penetration of said rotary rod, a drive shaft journaled on the frame, a centrally disposed drive wheel connected with the intermediate portion of said drive shaft, and means connected with the end of said drive shaft for operating said rotary rod.

20. In a rotary rod weeder, a frame, a pair of transversely extending rotary rods having their inner ends disposed adjacent one another, said rods being carried by said frame and adapted to penetrate the ground, means supporting the outer ends of said frame and operable to gauge the depth of penetration of said rotary rod, a transverse drive shaft journaled on said frame, means connecting the outer ends of the drive shaft with the inner ends, respectively, of said rotary rods, and a drive wheel for driving said rotary rods positioned midway between the ends of said frame and operatively connected with the intermediate portion of the drive shaft for driving the latter.

FRANK T. COURT.